A. T. BOON.
Gate.
No. 53,263.
Patented March 20, 1866.
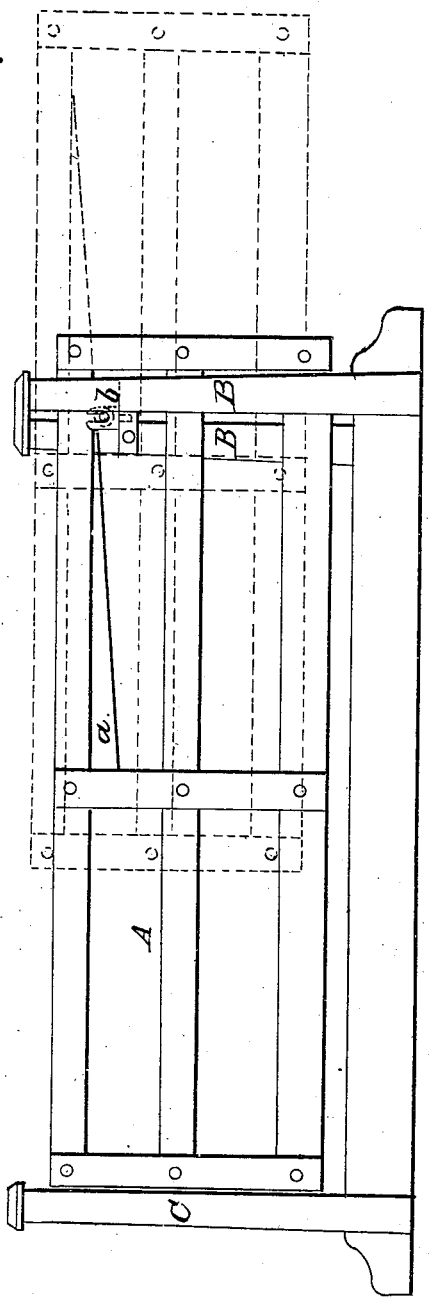

UNITED STATES PATENT OFFICE.

ALONZO T. BOON, OF GALESBURG, ILLINOIS.

IMPROVEMENT IN GATES.

Specification forming part of Letters Patent No. 53,263, dated March 20, 1866.

*To all whom it may concern:*

Be it known that I, ALONZO T. BOON, of the city of Galesburg, and county of Knox, and State of Illinois, have invented a new and useful Improvement in Gates; and I do hereby declare the following to be a full, clear, and exact description of the construction and operation of the same, reference being had to the accompanying drawing, making a part of this specification, in which the figure in the drawing represents a front view of the gate.

The nature of my improvement consists in the construction of an elongated angular bar and its attachment to the under side of the top horizontal bar of a sliding gate, between the rear vertical bar and the middle one, or so constructing the top bar as to have the angular shape or inclination made from it on the under side without any addition thereto to form the same, the object of said angular or inclined bar being to elevate the gate sufficiently high above the ground, when slid backward, to clear the snow that may be on the ground in the winter season without the trouble and labor of removing the same therefrom around the gate, and thereby enable the gate to be swung freely open, the said inclined bar sliding on a friction-roller working on a pivot when the same is swung around.

To enable others skilled in the art to make and use my invention, I will proceed to describe its construction and operation.

A represents the gate, constructed of three longitudinal and three vertical cross-bars; B B, the rear posts, of a suitable size and finished in the proper manner, one of which is placed in advance of the other, leaving a sufficient space for the gate to swing parallel with the road, as well as a sufficient space to enable the gate to be slid out to the proper distance at right angles to the road.

The longitudinal bars at the front end of the gate are notched on the under side to catch on cross-pins between a double post, C, (in which the gate slides,) to hold the gate when closed. The posts are finished off on the tops with suitable capping.

A is the angular or inclined bar, of a suitable size, properly secured under the top bar and side of the middle of the gate. *b* is a pivoted friction-roller, on which the gate slides and swings around, supported by a block or bar of wood or metal, and secured to and between the rear posts.

Operation: The gate is slid back on the friction-roller as far as the middle bar, as seen in red lines in the figure of the drawing, the same traversing an inclined plane surface formed by the inclined bar herein described, thus lifting the gate clear of the snow, when the same is on the ground in the winter season, (which is the object of the improvement,) and thereby obviating the trouble and labor of clearing it away before the gate can be opened. It is then swung around parallel with the road. A slight lift of the gate upward will bring it to a level, and thereby enable it to be moved with but little effort, if desired, when brought back to its proper position. No exertion is required further than the direction and guidance of the same, the momentum on its return back being given by the under descent of the inclined bar. The bar is so constructed that it may be detached in the summer season, not being required at that time, by using suitable and ordinary screws.

I am aware of a pivoted friction-roller or swivel-guide having been used to slide and swing the gate around on, as well as its being used for a variety of similar purposes. Therefore, I do not claim the same in the manner and for the purpose for which it is or has been used; but What I do claim, and desire to secure by Letters Patent, is—

The construction of an elongated angular or inclined bar, *a*, as arranged when used, in combination, with a pivoted friction-roller, *b*, substantially in the manner and for the purpose as herein set forth.

ALONZO T. BOON.

Witnesses:
C. F. CALKINS,
W. C. CALKINS.